Oct. 25, 1949.  C. M. FISHER  2,485,872
LOCK HOOK
Filed Jan. 2, 1946
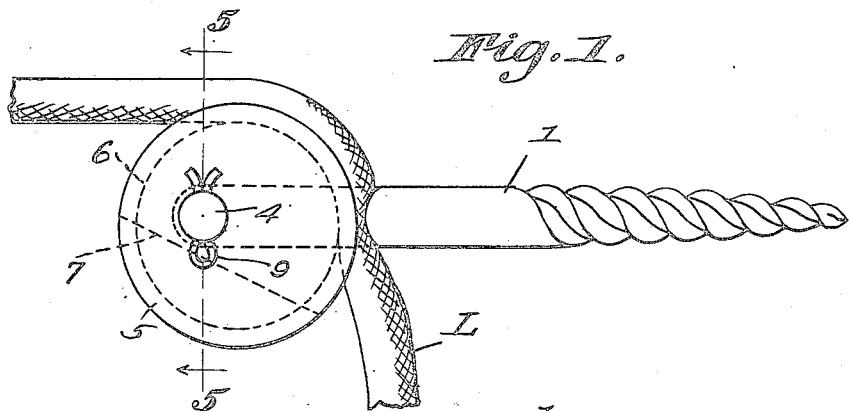
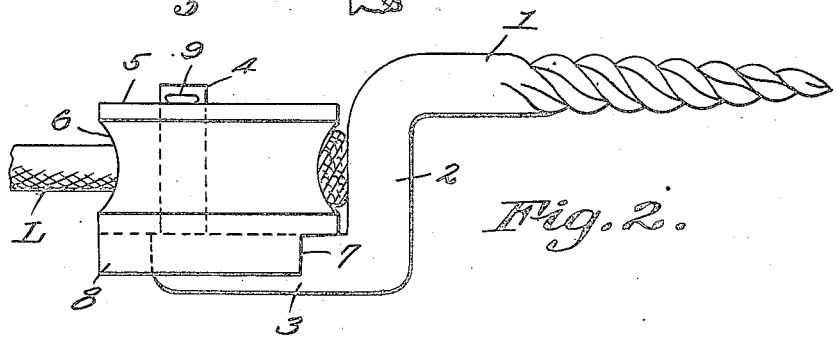
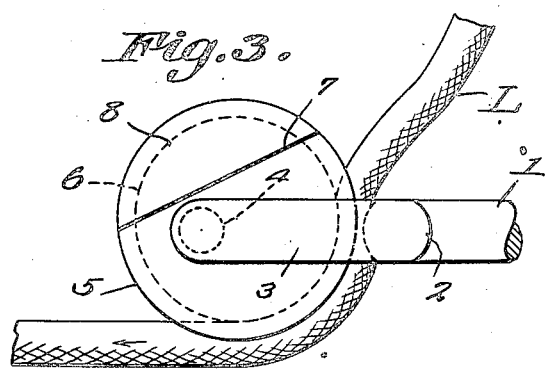
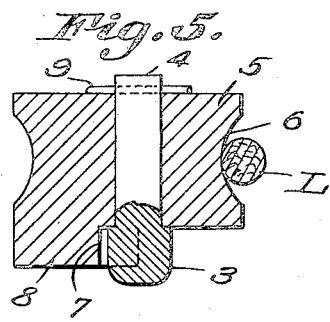
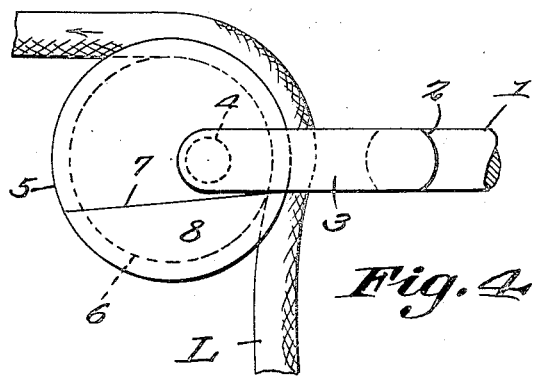
C. M. Fisher
INVENTOR.
BY *CNSnowles*
ATTORNEYS.

Patented Oct. 25, 1949

2,485,872

UNITED STATES PATENT OFFICE 2,485,872

LOCK HOOK

Clyde M. Fisher, Youngwood, Pa.

Application January 2, 1946, Serial No. 638,654

1 Claim. (Cl. 24—134)

This invention relates to a lock hook, one of the objects being to provide a hook with efficient means whereby a flexible line, such as a rope or cable, can be drawn taut and then held without slipping.

It is a further object of the invention to provide a device of this character which is very simple in construction and which is formed of only two parts.

A still further object is to provide a locking hook utilizing a cam for pinching the engaged line to hold it against retrograde movement, excessive pinching of the line by the cam being prevented by means provided for that purpose.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

Figure 1 is an elevation of the hook the same being shown in clamping engagement with a line.

Figure 2 is a bottom plan view of the structure shown in Figure 1.

Figure 3 is an elevation showing the opposite side of the structure illustrated in Figure 1.

Figure 4 is a view similar to Figure 3 showing the line released from the gripping action of the device.

Figure 5 is a section on line 5—5 of Figure 1.

Referring to the figures by characters of reference, 1 designates the shank of the hook one end of which has an angular or L-shaped head comprising a lateral arm 2 and a finger 3 extending at right angles from the arm. A stud 4 projects laterally from the finger 3 and is substantially parallel with the arm 2. On the stud is rotatively mounted a circular cam 5 having a peripheral groove 6 and the parts are so proportioned that, when a line L is placed between arm 2 and the cam 5, rotation of the cam in one direction will cause it to pinch the line as shown in Figures 1, 2, and 3. If the pull on the line is in the direction indicated by the arrows in Figure 3, said pull will tend to further tighten the grip of the cam upon the line, as will be obvious. Excessive rotation of the cam under the pulling action of the line can be limited by means of a shoulder 7 in the form of a chordal surface upon one face of the cam and formed by providing said face with a segmental extension 8. Obviously when the line is pulled in a direction opposite to that indicated in Figure 3 the tendency thereof will be to swing the cam so as to relieve the line, as shown in Figure 4. Thus the line can be drawn taut, after which by releasing it gradually the cam can be caused to swing from the position in Figure 4 substantially to the position as shown in Figures 1, 2 and 3.

It is to be understood of course that any suitable means, such as a cotter pin can be used for holding the cam on the stud 4. This has been shown at 9.

Considering Fig. 3, the right end of the stop shoulder, if any abnormal pull is exerted on rope L during use, will be brought fully against the side of finger 3, thus to prevent said abnormal pull from moving the cam on through its operative position shown and accidentally relieving the pinching engagement. In Fig. 4, the other end of the stop shoulder will be seen to engage the other side of the finger to retain the cam in a selected inoperative position from which it can be readily swung into operative position. Said ends, as will be observed, limit rotation of the cam through approximately 180° in either direction.

What is claimed is:

The combination, with a hook comprising a smooth-surfaced arm, a finger extended therefrom, and a stud extended from the finger, said stud and arm being substantially parallel, of an eccentrically mounted circular cam having a smooth-surfaced peripheral line-receiving groove mounted rotatably on the stud and shiftable relative to the arm, said arm and cam cooperating to pinch a line interposed therebetween, one face of the cam being seated upon and slidably contacting the finger during rotation of the cam; and a stop shoulder integrally formed upon said face and disposed in the plane of the finger, said shoulder defining a long chord extending across said face to the cam the end portions of which chord are spaced a substantial distance from each other, so as to be respectively adapted to engage opposite sides of the finger on rotation of the cam in opposite directions, to limit rotation of the cam through approximately 180 degrees in either direction to a selected operative and a selected inoperative position.

CLYDE M. FISHER.

REFERENCES CITED

The following references are of record in the file of this patent:

UNITED STATES PATENTS

| Number | Name | Date |
|---|---|---|
| 769,620 | Mandrey | Sept. 6, 1904 |
| 921,458 | Raithel et al. | May 11, 1909 |
| 1,067,412 | Eckhardt et al. | July 15, 1913 |
| 1,190,467 | Schnelle | July 11, 1916 |
| 1,424,084 | Cole | July 25, 1922 |